US010549781B2

United States Patent
Park et al.

(10) Patent No.: US 10,549,781 B2
(45) Date of Patent: Feb. 4, 2020

(54) INTEGRATED CONTROL METHOD FOR IMPROVING FORWARD COLLISION AVOIDANCE PERFORMANCE AND VEHICLE THEREFOR

(71) Applicants: Hyundai Motor Company, Seoul (KR); Kia Motors Corporation, Seoul (KR)

(72) Inventors: Jae-Il Park, Seoul (KR); Sung-Wook Hwang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 308 days.

(21) Appl. No.: 15/809,791

(22) Filed: Nov. 10, 2017

(65) Prior Publication Data

US 2018/0162444 A1 Jun. 14, 2018

(30) Foreign Application Priority Data

Dec. 14, 2016 (KR) .......................... 10-2016-0170709

(51) Int. Cl.
*B62D 6/00* (2006.01)
*B62D 15/02* (2006.01)
(Continued)

(52) U.S. Cl.
CPC ....... *B62D 15/0265* (2013.01); *B60W 10/119* (2013.01); *B60W 10/18* (2013.01);
(Continued)

(58) Field of Classification Search
CPC ... B62D 15/0265; G08G 1/166; B60W 30/09; B60W 2540/18; B60W 2550/10;
(Continued)

(56) References Cited

U.S. PATENT DOCUMENTS 10,431,091 B2 * 10/2019 Satoh ................. G01C 21/3602
2005/0004732 A1 * 1/2005 Berry .................... B60W 10/06
701/48

(Continued)

FOREIGN PATENT DOCUMENTS

| JP | 2010-179761 A | 8/2010 |
|---|---|---|
| KR | 10-2014-0126975 A | 11/2014 |
| KR | 10-2015-0132549 | 11/2015 |
| KR | 10-2016-0115247 A | 10/2016 |

*Primary Examiner* — Shardul D Patel
(74) *Attorney, Agent, or Firm* — Morgan, Lewis & Bockius LLP

(57) ABSTRACT

A vehicle according to an exemplary embodiment of the present invention includes an electronic chassis control system configured for an electronic control suspension (ECS), a motor driven power steering system (MDPS), an electronic stability control (ESC), and an all wheel drive (AWD), and an integrated controller implementing an integrated avoidance control in which controls for each of the MDPS, the ESC, and the AWD according to an emergency avoidance control of the ECS in the forward collision situation, wherein it is possible to safely and rapidly avoid risk of forward collision, and cooperative control performance of the ECS and the AWD, the ESC and the MDPS is optimized by applying an emergency grade to the integrated avoidance control.

20 Claims, 6 Drawing Sheets

(51) Int. Cl.
*B60W 30/09* (2012.01)
*G08G 1/16* (2006.01)
*B60W 30/08* (2012.01)
*B60W 10/119* (2012.01)
*B60W 10/18* (2012.01)
*B60W 10/20* (2006.01)
*B60W 10/22* (2006.01)

(52) U.S. Cl.
CPC ............ *B60W 10/20* (2013.01); *B60W 10/22* (2013.01); *B60W 30/08* (2013.01); *B60W 30/09* (2013.01); *G08G 1/166* (2013.01); *B60W 2540/18* (2013.01); *B60W 2550/10* (2013.01); *B60W 2710/202* (2013.01); *B60W 2710/226* (2013.01); *B60W 2720/40* (2013.01); *B60W 2720/403* (2013.01)

(58) Field of Classification Search
CPC ........... B60W 2710/202; B60W 30/08; B60W 10/22; B60W 10/20; B60W 10/18; B60W 10/119; B60W 2710/226; B60W 2720/403; B60W 2720/40; B60W 2550/308
USPC .................. 701/1, 41, 46, 37, 70, 300, 301; 180/65.1
See application file for complete search history.

(56) References Cited

U.S. PATENT DOCUMENTS

| | | | |
|---|---|---|---|
| 2009/0145674 A1* | 6/2009 | Lee ........................ | B60K 6/405 180/65.1 |
| 2012/0101701 A1* | 4/2012 | Moshchuk .......... | B60W 10/184 701/70 |
| 2013/0024075 A1* | 1/2013 | Zagorski ............. | B60W 30/095 701/46 |
| 2014/0297115 A1* | 10/2014 | Kang .................. | B60W 50/082 701/37 |
| 2014/0350836 A1* | 11/2014 | Stettner ................. | G01S 17/023 701/301 |
| 2016/0229397 A1* | 8/2016 | Muthukumar ........ | B60R 21/013 |
| 2017/0137023 A1* | 5/2017 | Anderson .......... | B60G 17/0195 |
| 2019/0184978 A1* | 6/2019 | Park ....................... | B62D 7/159 |

* cited by examiner

| EMERGENCY FIG | TTC (TIME TO COLLISION) SITUATION | CONTROL |
|---|---|---|
| 1 | 2 SECONDS BEFORE COLLISION THAT WILL OCCUR IF THE VEHICLE DOES NOT PERFORM BRAKING AT HIGH SPEED | · WARNING (SOUNDING ALARM TO MAKE DRIVER TO RECOGNIZE SITUATION) |
| 2 | 1.3 SECONDS BEFORE COLLISION THAT WILL OCCUR IF THE VEHICLE DOES NOT PERFORM BRAKING AT HIGH SPEED | · PARTIAL BRAKE (PERFORMING PARTIAL BRAKING AND GENERATING BRAKING PRESSURE IN ADVANCE SO THAT IT IS POSSIBLE TO IMMEDIATELY RESPOND WHEN DRIVER PERFORMS BRAKING) |
| 3 | 0.9 SECONDS BEFORE COLLISION THAT WILL OCCUR IF THE VEHICLE DOES NOT PERFORM BRAKING AT HIGH SPEED | · FULL BRAKE |

| STEERING ASSIST MODE | SITUATION | CONTROL |
|---|---|---|
| 1 | · EMERGENCY FLG 1 SITUATION | · INCREASING MDPS ASSIST TORQUE BY 20% |
| 2 | · EMERGENCY FLG 2/3 SITUATION | · INCREASING MDPS ASSIST TORQUE BY 30% |

FIG. 4

| CONTROL SITUATION | | ECS | MDPS | ESC | AWD |
|---|---|---|---|---|---|
| EMERGENCY 1 | DRIVER STEERING Y | FRONT WHEEL SOFT REAR WHEEL HARD | STEERING ASSIST MODE 1 | CHANGE OF CONTROL VALUE | TORQUE DISTRIBUTION LIMITATION |
| | DRIVER STEERING N | FRONT WHEEL HARD REAR WHEEL HARD | STEERING ASSIST MODE 1 | CONTROL X | NORMAL CONTROL |
| EMERGENCY 2 | DRIVER STEERING Y | FRONT WHEEL SOFT REAR WHEEL HARD | STEERING ASSIST MODE 2 | CHANGE OF CONTROL VALUE | TORQUE DISTRIBUTION LIMITATION |
| | DRIVER STEERING N | FRONT WHEEL HARD REAR WHEEL HARD | STEERING ASSIST MODE 2 | CONTROL X | NORMAL CONTROL |
| EMERGENCY 3 | DRIVER STEERING Y | FRONT WHEEL SOFT REAR WHEEL HARD | STEERING ASSIST MODE 2 | ROTATING INNER RACE CONTROL | TORQUE DISTRIBUTION LIMITATION |
| | DRIVER STEERING N | FRONT WHEEL HARD REAR WHEEL HARD | STEERING ASSIST MODE 2 | CONTROL X | NORMAL CONTROL |
| STABILIZATION AFTER AVOIDANCE | SLOW COUNTER STEER | FRONT WHEEL HARD REAR WHEEL SOFT | STABILIZATION ASSIST MODE 1 | ENGINE TORQUE DECREASE CONTROL | NORMAL CONTROL |
| | FAST COUNTER STEER | | | ROTATING OUTER RACE CONTROL | TORQUE DISTRIBUTION INCREASE |

FIG. 6

INTEGRATED CONTROL METHOD FOR IMPROVING FORWARD COLLISION AVOIDANCE PERFORMANCE AND VEHICLE THEREFOR

CROSS-REFERENCE(S) TO RELATED APPLICATIONS

The present application claims priority to Korean Patent Application No. 10-2016-0170709, filed on Dec. 14, 2016, the entire contents of which is incorporated herein for all purposes by this reference.

BACKGROUND OF THE INVENTION

Field of the Invention

The present invention relate to an integrated control of an electronic chassis control system, and more particularly, to a vehicle to which an integrated control method for improving forward collision avoidance performance that does not conflict with an all wheel drive (AWD), an electronic stability control (ESC), and a motor driven power steering system (MDPS) at the time of emergency avoidance control of an electronic control suspension (ECS) is applied.

Description of Related Art

Generally, an all wheel drive (AWD), an electronic stability control (ESC), a motor driven power steering system (MDPS), and an electronic control suspension (ECS) that are individual auxiliary chassis systems are constructed as an electronic chassis control system to optimize vehicle performance, and integrally controlled to optimize vehicle stability.

Specifically, the AWD, the ESC, and the MDPS optimize cornering stability of a vehicle.

For example, in view of vehicle handling control based on a front engine rear drive (FR), the AWD distributes torque to front wheels when oversteer of the vehicle occurs to stabilize yaw behavior of the vehicle, and does not distribute torque to the front wheels when understeer occurs to improve agility of the vehicle. In view of the behavior of the vehicle, the ESC individually applies brakes to the wheels by torque vectoring control when understeer or oversteer seems to occur due to an unstable behavior of the vehicle, thereby securing stability of the vehicle. In view of the steering response of the vehicle, the MDPS improves the steering response by adjusting an assist torque gain, thereby improving horizontal avoidance performance.

Specifically, the ECS secures vehicle collision safety.

For example, in view of an emergency avoidance of the vehicle, the ECS controls damping force of front and rear wheel dampers by oversteer or understeer characteristics when detecting a risk of collision with a preceding vehicle and/or obstacles, thereby improving collision avoidance performance of the vehicle.

Therefore, riding and handling (R&H) performance of the vehicle is greatly improved by integrally controlling the ESC, the AWD, the MDPS, and the ECS.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

In a case of integrated control including the ECS and all or any one of the AWD, the ESC, and the MDPS, when a specific condition of a vehicle is not satisfied, control strategies of the ECS, the AWD, the ESC, and the MDPS may conflict with each other.

For example, all of the AWD, the ESC, and the MDPS have control strategies for improving vehicle stability, whereas the ECS has a control strategy for improving avoidance performance. As a result, an emergency avoidance control operation of the ECS that is performed when a specific condition is not satisfied including a vehicle collision avoidance control, may limit a vehicle safety control operation of the AWD, the ESC, and the MDPS, or the vehicle safety control operation of the AWD, the ESC, and the MDPS may limit the emergency avoidance control operation of the ECS.

Various aspects of the present invention are directed to providing an integrated control method for improving forward collision avoidance performance in which an integrated avoidance control of allowing a control of the AWD, the ESC, the MDPS to be consistent with a control of the ECS at the time of emergency avoidance control of the ECS configured together with the AWD, the ESC, and the MDPS is performed wherein a vehicle may safely avoid risk of a forward collision, and cooperative control performance of the ECS and the AWS, the ESC and MDPS is optimized by applying an emergency grade to the integrated avoidance control, and a vehicle therefore.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, an integrated control method for improving forward collision avoidance performance includes (A) an avoidance condition determination mode step in which an integrated controller determines a forward collision situation of a vehicle to which an electronic chassis control system including an electronic control suspension (ECS), a motor driven power steering system (MDPS), an electronic stability control (ESC), and an all wheel drive (AWD) is applied and Emergency Flg for a control of the electronic chassis control system is generated; (B) an avoidance grade application mode step in which the Emergency Flg is graded as three grades of Emergency Flg 1, Emergency Flg 2, and Emergency Flg 3 to be applied to a control of the ECS, and controls for each of the MDPS, the ESC, and the AWD are in consistent with the three-grade control of the ECS to perform a forward collision situation control; and (C) a vehicle stabilization mode step in which after the forward collision situation control is performed by the three-grade control of the ECS, the controls for the MDPS, the ESC, and the AWD are performed as independent control from the ECS to complete forward collision situation avoidance.

The avoidance condition determination mode may be implemented by (a-1) a step of reading a detection value of a vehicle-mounted detector of the vehicle, (a-2) a step of generating the Emergency Flg when the detection value satisfies a forward collision condition, (a-3) a step of determining necessity for steering avoidance after the generation of the Emergency Flg, and (a-4) a step of, when the necessity for the steering avoidance is not determined, operating an autonomous emergency brake (AEB) in a state in which a driver does not perform braking so that the forward collision condition is not satisfied.

When the forward collision situation control is performed in the Emergency Flg 1, in an avoidance control of the ECS, a front wheel shock absorber of the vehicle may be set as SOFT to increase damping force and a rear wheel shock absorber may be set as HARD to decrease damping force, in a steering assist mode 1 control of the MDPS, steering assist torque may be increased by 20%, the ESC may perform a change of a control value for a unique control thereof, and in a limiting control of the AWD, torque distribution to front and rear wheels of the vehicle may be limited.

When the forward collision situation control is performed in the Emergency Flg 2, in an avoidance control of the ECS, a front wheel shock absorber of the vehicle may be set as SOFT to increase damping force and a rear wheel shock absorber may be set as HARD to decrease damping force, in a steering assist mode 1 control of the MDPS, steering assist torque may be increased by 30%, the ESC performs a change of a control value for a unique control thereof, and in a limiting control of the AWD, torque distribution to front and rear wheels of the vehicle may be limited.

When the forward collision situation control is performed in the Emergency Flg 3, in an avoidance control of the ECS, a front wheel shock absorber of the vehicle may be set as SOFT to increase damping force and a rear wheel shock absorber may be set as HARD to decrease damping force, in a steering assist mode 2 control of the MDPS, steering assist torque may be increased by 30%, the internal race control of the ESC may be a unique torque vectoring control for a rotating internal race of the vehicle, and in a limiting control of the AWD, torque distribution to front and rear wheels of the vehicle may be limited.

When the independent control is performed, a stabilization control of the ECS, a stabilization assist mode 1 control of the MDPS, a limiting control of the ESC, and a limiting control of the AWD may be performed by being divided into SLOW steering that is slow countersteer with respect to a steering wheel of a driver, and FAST steering that is fast countersteer with respect to the steering wheel of the driver.

In a case of the SLOW steering, in the stabilization control of the ECS, a front wheel shock absorber of the vehicle may be set as HARD to decrease damping force and a rear wheel shock absorber may be set as SOFT to increase damping force, in the stabilization assist mode 1 control of the MDPS, steering effort may be lowered, in the stabilization control of the ESC, engine torque according to a unique torque vectoring control may be decreased, and in the increasing torque distribution control of the AWD, torque distribution to front and rear wheels of the vehicle may be performed as unique torque distribution.

In a case of the FAST steering, in the stabilization control of the ECS, a front wheel shock absorber of the vehicle may be set as HARD to decrease damping force and a rear wheel shock absorber may be set as SOFT to increase damping force, in the stabilization assist mode 1 control of the MDPS, steering effort may be increased, in the stabilization control of the ESC a unique torque vectoring control for a rotating external race of the vehicle may be limited, and in the increasing torque distribution control of the AWD, unique torque distribution to front and rear wheels of the vehicle may be increased.

In accordance with another exemplary embodiment of the present invention, a vehicle includes an integrated controller configured to implement an integrated avoidance control in which when controlling an electronic chassis control system configured for an electronic control suspension (ECS), a motor driven power steering system (MDPS), an electronic stability control (ESC), and an all wheel drive (AWD) as auxiliary chassis systems in a forward collision situation, controls for the MDPS, the ESC, and the AWD are performed to be consistent with an emergency avoidance control of the ECS.

The integrated controller may include an emergency map, the emergency map including an emergency grade table according to which a control of the electronic chassis control system is changed in the forward collision situation of the vehicle, and a steering assist mode increasing steering force according to the emergency grade table.

The emergency grade table may be divided into three grades of Emergency Flg 1 matched to a steering assist mode 1 of the steering assist mode, and Emergency Flg 2 and Emergency Flg 3 matched to a steering assist mode 2 of the steering assist mode.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is an example of an emergency grade table of an ECS and a steering assist mode of an MDPS at the time of integrated control according to an exemplary embodiment of the present invention.

FIG. 6 illustrates an operation table of the electronic chassis control system at the time of integrated avoidance control according to an exemplary embodiment of the present invention.

Figure 1:
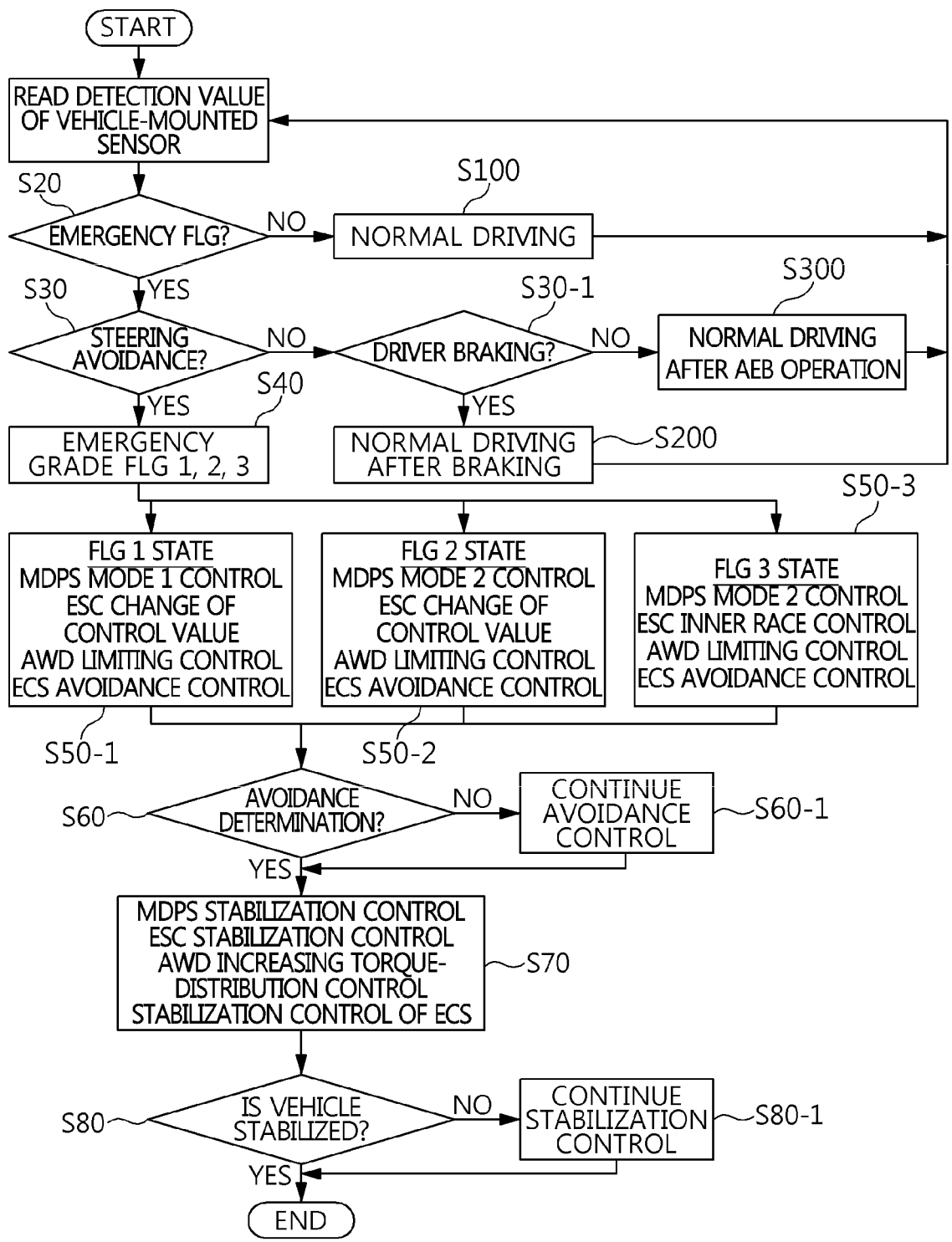
FIG. 1 is a flowchart illustrating that an integrated control for improving forward collision avoidance performance is implemented by an integrated avoidance control method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Referring to FIG. 1, an integrated control for improving forward collision avoidance performance is implemented by an integrated avoidance control method using an electronic chassis control system. In the integrated avoidance control, Emergency Flg as a forward collision risk index (or forward collision avoidance index) is graded as three grades from Emergency Flg 1 to Emergency Flg 3, and a steering assist mode of a motor driven power steering system (MDPS) is divided into two levels of a steering assist mode 1 and a steering assist mode 2 to be matched to the Emergency Flg 1 to Emergency Flg 3, and in the electronic chassis control system constructed with an electronic stability control (ESC), the MDPS, an all wheel drive (AWD), and an electronic control suspension (ECS) that are auxiliary chassis systems, respective control strategies of the MDPS, the AWD, and the ESC are changed to be consistent with the avoidance control of the ECS according to a combination of the Emergency Flg 1 to Emergency Flg 3 and the steering assist modes 1 and 2. As a result, the avoidance control operation of the ECS is not inhibited by the control of the MDPS, the AWD, and the ESC, wherein the electronic chassis control system may greatly improve forward collision avoidance performance while keeping basic performance for improving vehicle stability.

Figure 2:
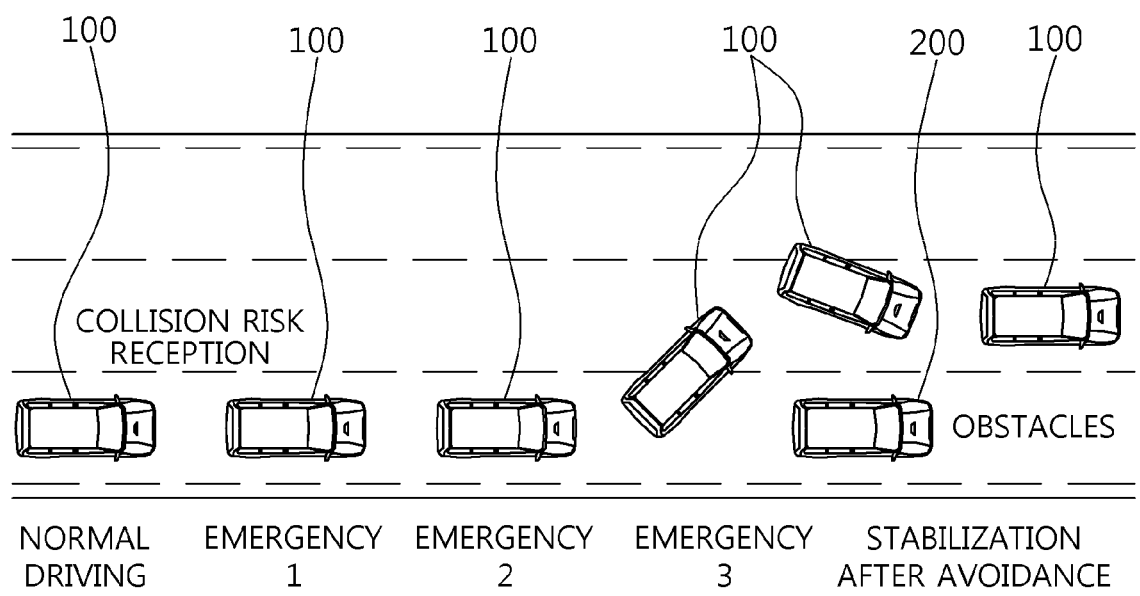
FIG. 2 illustrates a state of avoiding forward collision of a vehicle by the integrated avoidance control according to an exemplary embodiment of the present invention.

Referring to FIG. 2, a vehicle 100 determines a distance from a preceding vehicle 200 driving in front of the vehicle 100 by use of a vehicle-mounted detector including a radar detector, an ultrasonic detector, an image detector, etc., and when the determined distance is within a collision distance, determines that there is a collision risk. Then, an integrated controller 1-1 that has recognized the collision risk performs the integrated avoidance control, which is performed in order of an Emergency Flg 1 integrated control step linked with the steering assist mode 1, an Emergency Flg 2 integrated control step linked with the steering assist mode 2, and an Emergency Flg 3 integrated control step linked with the steering assist mode 2, and shifts the vehicle 100 to be in a stable state after the avoidance.

Figure 3:
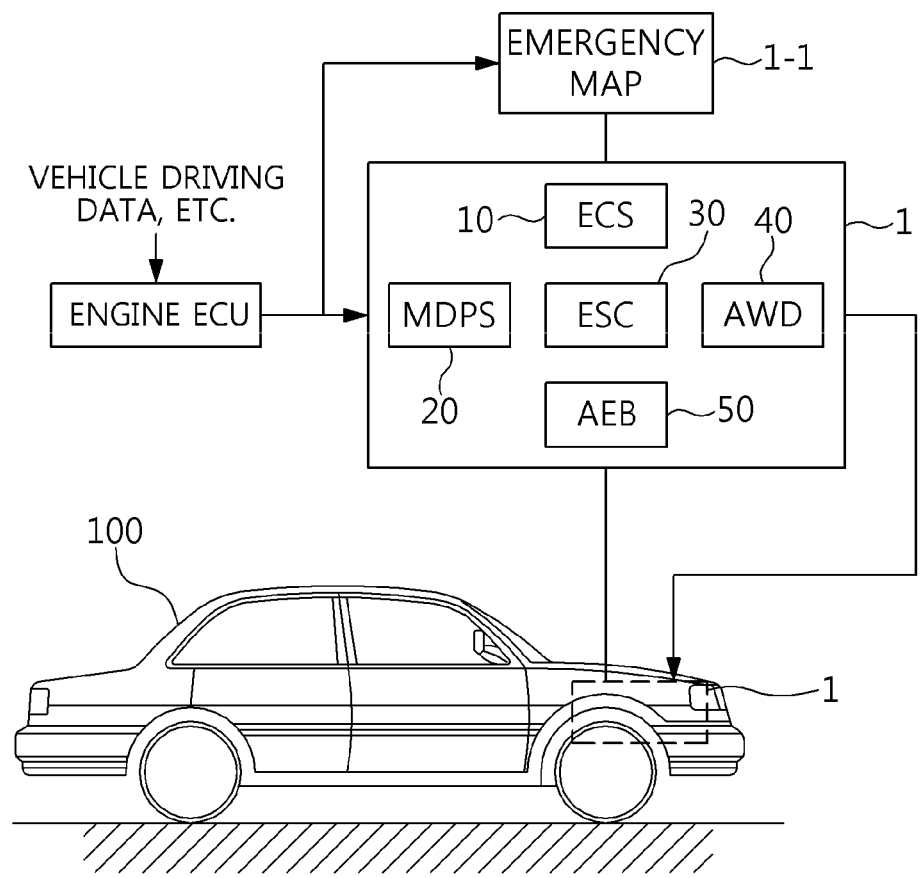
FIG. 3 illustrates an example of a vehicle to which an integrated controller implementing the integrated avoidance control according to an exemplary embodiment of the present invention is applied.

Referring to FIG. 3, the vehicle 100 includes an electronic chassis control system 1 controlled by the integrated controller 1-1, and the integrated controller 1-1 is connected to an engine electronic control unit (ECU) operated as a higher controller for the vehicle 100.

Specifically, the electronic chassis control system 1 is configured to include an electronic control suspension 10 having a control strategy for securing vehicle collision safety, a motor driven power steering system (MDPS) 20 having a control strategy for improving horizontal avoidance performance by adjusting an assist torque gain, an electronic stability control (ESC) 30 having a control strategy for implementing torque vectoring for individual braking of wheels, an all wheel drive (AWD) 40 having a control strategy for improving yaw behavior and the agility of the vehicle, and an autonomous emergency brake (AEB) 50 having a control strategy for implementing emergency braking that is autonomously performed without a response of a driver at the time of sudden braking of the preceding vehicle detected by the detector.

Specifically, the integrated controller 1-1 includes an emergency map, which may be included in the integrated controller 1-1 or separately configured to be linked with the integrated controller 1-1. The engine ECU processes vehicle driving data including a detection value of the vehicle-mounted detector provided in the vehicle 100 for emergency collision determination, a vehicle speed, engine torque, etc. As input information. The vehicle-mounted detector includes a radar detector or an ultrasonic detector required for emergency avoidance control of the ECS 10, and is the same as a general detector applied for the ECS. Further, a connection network between the integrated controller 1-1 and the engine ECU is constructed by CAN communication, wherein data transmission and reception are performed therebetween.

FIG. 4 shows an emergency grade table of the ECS and the steering assist mode of the MDPS that are constructed in the emergency map configuring the integrated controller 1-1.

the emergency grade table is divided into Emergency Flg 1, Emergency Flg 2, and Emergency Flg 3 that represent time to collision (TTC) situation in grades. Hereinafter, high speed means that the vehicle 100 drives at approximately 80 Kph or more. For example, the Emergency Flg 1 is a warning step in which the integrated controller 1-1 recognizes as a situation 2 seconds before collision that will occur when the vehicle does not perform braking at high speed, and the integrated controller 1-1 sounds an alarm to make a driver to recognize the situation, and is shifted to the Emergency Flg 1 integrated control step. The Emergency Flg 2 is a partial brake step in which the integrated controller 1-1 recognizes as a situation 1.3 seconds before collision that will occur when the vehicle does not perform braking at high speed, and the integrated controller 1-1 is shifted to the Emergency Flg 2 integrated control step in which partial braking is performed and braking pressure is generated in advance so that it is possible to immediately respond when the driver performs braking. The Emergency Flg 3 is a full brake step in which the integrated controller 1-1 recognizes as a situation 0.9 seconds before collision that will occur when the vehicle does not perform braking at high speed, and the integrated controller 1-1 is shifted to the Emergency Flg 3 integrated control step in which vehicle braking is practically performed.

The steering assist mode is divided into the steering assist mode 1 and the steering assist mode 2. For example, the steering assist mode 1 corresponds to the Emergency Flg 1, and MDPS assist torque of the MDPS 20 is increased by 20% to be consistence with the Emergency Flg 1 integrated control step of the integrated controller 1-1. The steering assist mode 2 corresponds to the Emergency Flg 2 and the Emergency Flg 3, and MDPS assist torque of the MDPS 20 is increased by 30% regardless of the Emergency Flg 2 integrated control step or the Emergency Flg 3 integrated control step of the integrated controller 1-1.

Hereinafter, the integrated control method of the electronic chassis control system of FIG. 1 will be specified as an integrated avoidance control and described in detail with reference to FIG. 3 to FIG. 6. In the present case, a control subject of the integrated avoidance control is the integrated controller 1-1 connected to the engine ECU and including the emergency map, and control targets of the integrated avoidance control are the ECS 10, the MDPS 20, the ESC 30, the AWD 40, and the AEB 50 configuring the electronic chassis control system 1. Further, the vehicle-mounted detector may be a radar detector, an ultrasonic detector, or an image detector.

The integrated controller 1-1 performs an avoidance condition determination mode for entering the integrated avoidance control. The avoidance condition determination mode is implemented by a vehicle-mounted detector detection value reading step in S10, an Emergency Flg generation step in S20, and a steering avoidance determination step in S30.

Referring to FIG. 3, the integrated controller 1-1 reads the detection value of the vehicle-mounted detector that is input to the engine ECU by receiving the detection value from the engine ECU, generates the Emergency Flg as collision risk based on a distance between vehicles (that is, a distance from the preceding vehicle), and determines whether to perform steering avoidance due to the generation of the Emergency Flg. As a result, the integrated controller 1-1 performs an avoidance grade control mode for performing the integrated avoidance control. The deceleration release step results from a case in which it is determined that the steering operation is not required in the steering avoidance determination step in S30, and is distinguished by whether a driver operates a brake in S30-1. S200 means that a safe distance between the vehicles is secured as the vehicle brakes by the braking operation of the driver, S300 means that the safe distance between the vehicles is secured after the vehicle braking is performed by the AEB 50 as an AEB output signal is output by the AEB 50 as illustrated in FIG. 5.

Next, the integrated controller 1-1 performs the integrated avoidance control in an avoidance grade application mode. The avoidance grade application mode is implemented by an emergency grading step in S40, an Emergency Flg 1 application step in S50-1, an Emergency Flg 2 application step in S50-2, an Emergency Flg 3 application step in S50-3, and an avoidance determination step in S60. In the instant case, the Emergency Flg 1 in S50-1, the Emergency Flg 2 in S50-2, and the Emergency Flg 3 in S50-3 are performed based on the emergency grading step in S40.

Figure 5:
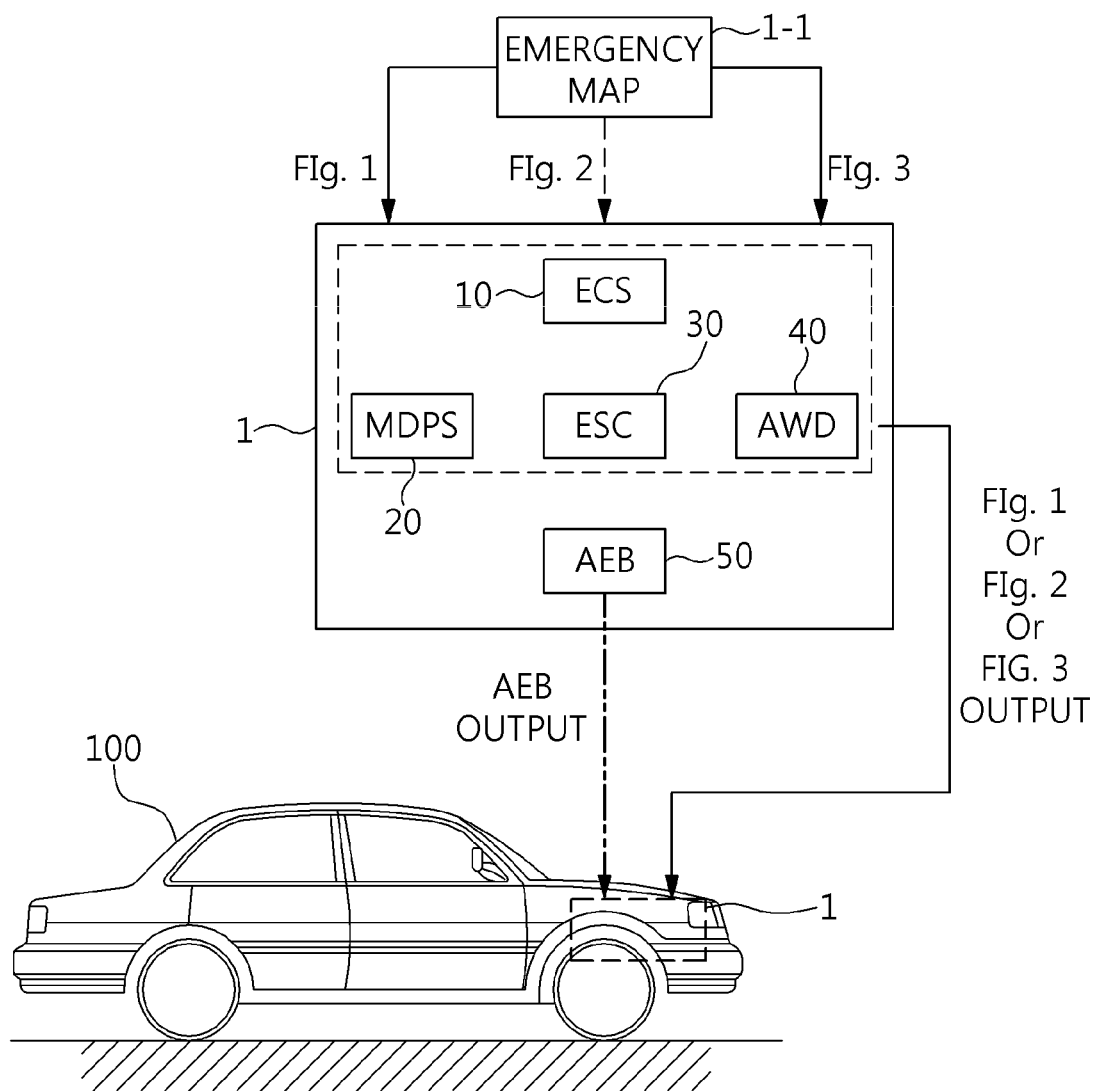
FIG. 5 illustrates an operation state of an electronic chassis control system at the time of integrated avoidance control according to an exemplary embodiment of the present invention.

Referring to FIG. 5, the integrated controller 1-1 grades emergency according to a distance between the vehicle 100 (that is, own vehicle) and the preceding vehicle 200, and the emergency grading is implemented as an Flg 1 output by the Emergency Flg 1 in S50-1, an Flg 2 output by the Emergency Flg 2 in S50-2, and an Flg 3 output by the Emergency Flg 3 in S50-3. In the present case, the Emergency Flg 1, the Emergency Flg 2, and the Emergency Flg 3 indicate a control degree for the electronic chassis control system 1, mean that the respective control strategies for the ECS 10, the MDPS 20, the ESC 30, and the AWD 40 are changed according thereto.

In the Emergency Flg 1 in S50-1, the integrated controller 1-1 performs an avoidance control of the ECS 10, a steering assist mode 1 control of the MDPS 20, a change of the control value for a unique control of the ESC 30, and a limiting control on the AWD 40. In the Emergency Flg 2 in S50-2, the integrated controller 1-1 performs an avoidance control of the ECS 10, a steering assist mode 2 control of the MDPS 20, a change of the control value for a unique control of the ESC 30, and a limiting control on the AWD 40. In the Emergency Flg 2 in S50-3, the integrated controller 1-1 performs an avoidance control of the ECS 10, a steering assist mode 2 control of the MDPS 20, a rotating internal race control of the ESC 30, and a limiting control on the AWD 40.

FIG. 6 shows an example in which Emergency 1 to Emergency 3, each matched to the Emergency Flg 1 to Emergency Flg 3, are respectively divided into driver steering Y (Y means that the driver performs the steering operation) and driver steering N (N means that the driver does not perform the steering operation). Here, "X" represents that the control is not performed.

In the driver steering Y, the ECS 10 performs an avoidance control in which a front wheel shock absorber is set as SOFT to increase damping force and a rear wheel shock absorber is set as HARD to decrease damping force with respect to each of the Emergency Flg 1 to Emergency Flg 3, the MDPA 20 performs a steering control in which steering assist torque is increased by 20% with respect to the Emergency Flg 1, and steering assist torque is increased by 30% with respect to each of the Emergency Flg 2 and Emergency Flg 3, the ESC 30 performs a change of the control value for the unique control with respect to each of the Emergency Flg 1 and Emergency Flg 2, and performs an internal race control by unique torque vectoring control with respect to the Emergency Flg 3, and the AWD 40 performs a limiting control in which torque distribution to the front and rear wheels is limited with respect to each of the Emergency Flg 1 to Emergency Flg 3. The above described controls are continuously performed as the avoidance control in S60-1, when it is determined that the avoidance is not made in the avoidance determination step in S60.

In the driver steering N, the ECS 10 performs an avoidance control in which both of the front wheel shock absorber and the rear wheel shock absorber are set as HARD to decrease damping force with respect to each of the Emergency Flg 1 to Emergency Flg 3, the MDPA 20 performs a steering control in which steering assist torque is increased by 20% with respect to the Emergency Flg 1, and steering assist torque is increased by 30% with respect to each of the Emergency Flg 2 and Emergency Flg 3, the ESC 30 does not perform a control with respect to each of the Emergency Flg 1 to Emergency Flg 3, and the AWD 40 performs a normal control in which torque distribution appropriate for yaw behavior stabilization through understeer or oversteer control is performed with respect to each of the Emergency Flg 1 to Emergency Flg 3. Here, the "normal control" means respective unique controls of the ECS 10, the ESC 30, and the AWD 40. For example, a normal control of the AWD 40 means that the AWD 40 performs a control according to its own AWD control strategy without following the integrated avoidance control. The above described controls are continuously performed as the avoidance control in S60-1, when it is determined that the avoidance is not made in the avoidance determination step in S60.

Next, the integrated controller 1-1 performs the integrated avoidance control in a vehicle stabilization mode. The vehicle stabilization mode is implemented by a post-avoidance stabilization control step in S70, and a vehicle stabilization determination step in S80.

The post-avoidance stabilization control in S70 is performed as a stabilization control of the ECS 10, a stabilization assist mode 1 control of the MDPS 20, a stabilization control of the ESC 30, and an increasing torque distribution control of the AWD 40. Therefore, in the vehicle stabilization mode, the control of each of the MDPS 20, the ESC 30, and the AWD 40 is performed independently from the ECS 10. That is, the integrated controller 1-1 performs the integrated control controlling the ECS 10, the MDPS 20, the ESC 30, and the AWD 40 by respective unique control strategies of the ECS 10, the MDPS 20, the ESC 30, and the AWD 40.

The vehicle stabilization determination in S80 meansend of the integrated control of the integrated controller 1-1.

Therefore, when it is not determined that the vehicle is stabilized in S80, the post-avoidance stabilization control in S70 is continuously performed as in S80-1 until it is determined that the vehicle is stabilized.

Referring to FIG. 6, the vehicle stabilization mode is divided into SLOW steering (that is, slow countersteer with respect to a steering wheel of the driver) and FAST steering (that is, fast countersteer with respect to a steering wheel of the driver).

In the SLOW steering, the ECS 10 performs a stabilization control in which the front wheel shock absorber is set as HARD to decrease damping force and the rear wheel shock absorber is set as SOFT to increase damping force, the MDPA 20 performs a steering control for lowering steering effort felt by the driver through the stabilization assist mode 1, the ESC 30 performs a torque vectoring control for reducing engine torque with respect to unique torque vectoring control, and the AWD 40 performs the normal control in which torque distribution appropriate for yaw behavior stabilization through understeer or oversteer control is performed.

In the FAST steering, the ECS 10 performs the stabilization control in which the front wheel shock absorber is set as HARD to decrease damping force and the rear wheel shock absorber is set as SOFT to increase damping force, the MDPA 20 performs a steering control for increasing steering effort felt by the driver through the stabilization assist mode 1, the ESC 30 limits a torque vectoring control for a rotating external race with respect to unique torque vectoring control, and the AWD 40 performs the increasing torque distribution control for increasing unique torque distribution for the front and rear wheels of the vehicle. The above described controls are continuously performed as the stabilization control in S80-1, when it is determined that the vehicle stabilization is not made in the vehicle stabilization determination step in S80.

The following Table 1 shows an Experimental Example for the integrated avoidance control, where a vehicle speed is 80 kph and 0.5 Hz sine wave steering (single lane change) is applied as a test item.

TABLE 1

| Scenario | Driving condition | Result |
| --- | --- | --- |
| 1. Sine wave avoidance constant speed | 1. Vehicle speed 80 kph<br>2. Steering angle 90 deg,<br>0.5 Hz sine | About 15.8 cm of horizontal distance gain |
| 2. Sine wave avoidance acceleration | 1. Vehicle speed 80 kph<br>2. Steering angle 90 deg,<br>0.5 Hz sine<br>3. Acceleration by 25% | About 20.6 cm of horizontal distance gain |
| 3. Sine wave avoidance deceleration | 1. Vehicle speed 80 kph<br>2. Steering angle 90 deg,<br>0.5 Hz sine<br>3. 30 bar brake | About 13.3 cm of horizontal distance gain |
| 4. Double lane change (ISO-3888-2) | Emergency situation driving mode<br>Vehicle speed 70 kph | Decrease in steering angle by 5.6% |

As described above, the vehicle according to the present embodiment includes the electronic chassis control system 1 configured for the ECS 10, the MDPS 20, the ESC 30, and the AWD 40, and the integrated controller 1-1 implementing the integrated avoidance control in which the controls for each of the MDPS 20, the ESC 30, and the AWD 40 according to the emergency avoidance control of the ECS 10 in the forward collision situation, wherein it is possible to safely and rapidly avoid the risk of forward collision, and The cooperative control performance of the ECS and the AWD, the ESC and the MDPS is optimized by applying the emergency grade to the integrated avoidance control.

In the vehicle according to an exemplary embodiment of the present invention, the integrated avoidance control for improving forward collision avoidance performance is applied to the integrated control of the electric chassis control system, implementing the following advantages and effects.

First, even when the electronic chassis control system is configured for the AWD, the ESC, and the MDPS having a control strategy for improving vehicle stability, and the ECS having a control strategy for improving avoidance performance, individual operations of the AWD, the ESC, the MDPS, and the ECS may not conflict with each other. Second, it is possible to optimize individual control performance of the AWD, the ESC, the MDPS, and the ECS by classifying the integrated control with the emergency grade to allow the controls of the AWS, the ESC, the MDPS, and the ECS to be different from each other. Third, even when the ECS is operated simultaneously with the AWD, the ESC, and the MDPS, the avoidance performance of the ECS is not limited. Fourth, since the avoidance performance of the ECS is not limited, it is possible to safely cope with an emergency situation including vehicle collision. Fifth, the electronic chassis control system is specialized in the avoidance performance of the ECS while keeping the individual control performance of the AWD, the ESC, the MDPS, further improving safety and marketability of the vehicle.

For convenience in explanation and accurate definition in the appended claims, the terms "upper", "lower", "internal" and "outer", "up," "down," "upper", "lower," "upwards," "downwards", "front", "rear", "back", "inside", "outside", "inwardly," "outwardly," "internal", "external", "internal," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated control method performed as an integrated avoidance control in which when a vehicle to which an electronic chassis control system configured for an electronic control suspension (ECS), a motor driven power steering system (MDPS), and an all wheel drive (AWD) is applied faces a forward collision situation, an integrated controller is configured to perform a forward collision situation control wherein controls for each of the MDPS, and the AWD are according to a control of the ECS, completing forward collision situation avoidance, wherein in the integrated avoidance control, an avoidance condition determination mode in which Emergency Flg for a control of the electronic chassis control system is generated is performed; an avoidance grade application mode in which the Emergency Flg is graded as three grades of Emergency Flg 1, Emergency Flg 2, and Emergency Flg 3 to be applied to the control of the ECS, and the controls for each of the MDPS, and the AWD are according to the three-grade control of the ECS to perform the forward collision situation control is performed; and a vehicle stabilization mode in which after the forward collision situation control is performed by the three-grade control of the ECS, the controls for the MDPS and the AWD are performed as independent control from the ECS to complete the forward collision situation avoidance is performed.

2. The integrated control method of claim 1, wherein the control of the ECS is applied to an electronic stability control (ESC) and the control for the ESC, according to the three-grade control of the ECS to perform the forward collision situation control is performed; and a vehicle stabilization mode in which after the forward collision situation control is performed by the three-grade control of the ECS, the control for the ESC is performed as independent control from the ECS to complete the forward collision situation avoidance is performed.

3. The integrated control method of claim 2, wherein in the avoidance condition determination mode, a detection value of a vehicle-mounted detector of the vehicle is read, the Emergency Flg is generated when the detection value satisfies a forward collision condition, and necessity for steering avoidance is determined after the generation of the Emergency Flg.

4. The integrated control method of claim 3, wherein when the necessity for the steering avoidance is not determined, an autonomous emergency brake (AEB) is configured to be operated in a state in which a driver does not perform braking so that the forward collision condition is not satisfied.

5. The integrated control method of claim 2, wherein when the forward collision situation control is performed in the Emergency Flg 1, the ECS performs an avoidance control according to the forward collision situation control, the MDPS performs a steering assist mode 1 control according to the forward collision situation control, the ESC performs a change of a control value for a unique control thereof, and the AWD performs a limiting control for a unique control thereof.

6. The integrated control method of claim 5, wherein in the avoidance control of the ECS, a front wheel shock absorber of the vehicle is SOFT to increase a damping force and a rear wheel shock absorber is HARD to decrease damping force, in the steering assist mode 1 control of the MDPS, steering assist torque is configured to be increased with respect to a steering operation of a driver, the ESC performs the change of the control value for the unique control thereof, and in the limiting control of the AWD, torque distribution to front and rear wheels of the vehicle is limited.

7. The integrated control method of claim 2, wherein when the forward collision situation control is performed in the Emergency Flg 2, the ECS performs an avoidance control according to the forward collision situation control, the MDPS performs a steering assist mode 2 control according to the forward collision situation control, the ESC performs a change of a control value for a unique control thereof, and the AWD performs a limiting control for a unique control thereof.

8. The integrated control method of claim 7, wherein in the avoidance control of the ECS, a front wheel shock absorber of the vehicle is SOFT to increase a damping force and a rear wheel shock absorber is HARD to decrease damping force, in the steering assist mode 2 control of the MDPS, steering assist torque is configured to be increased with respect to a steering operation of a driver, the ESC performs the change of the control value for the unique control thereof, and in the limiting control of the AWD, torque distribution to front and rear wheels of the vehicle is limited.

9. The integrated control method of claim 2, wherein when the forward collision situation control is performed in the Emergency Flg 3, the ECS performs an avoidance control according to the forward collision situation control, the MDPS performs a steering assist mode 2 control according to the forward collision situation control, the ESC performs a vehicle internal race control according to the forward collision situation control, and the AWD performs a limiting control for a unique control thereof.

10. The integrated control method of claim 9, wherein in the avoidance control of the ECS, a front wheel shock absorber of the vehicle is SOFT to increase a damping force and a rear wheel shock absorber is HARD to decrease damping force, in the steering assist mode 2 control of the MDPS, steering assist torque is configured to be increased with respect to a steering operation of a driver, the internal race control of the ESC is a unique torque vectoring control for a rotating internal race of the vehicle, and in the limiting control of the AWD, torque distribution to front and rear wheels of the vehicle is limited.

11. The integrated control method of claim 2, wherein when the independent control is performed, the ECS performs a stabilization control according to the forward collision situation avoidance, the MDPS performs a stabilization assist mode 1 control according to the forward collision situation avoidance, the ESC performs a stabilization control for a unique control thereof according to the forward collision situation avoidance, and the AWD performs an increasing torque distribution control for a unique control thereof according to the forward collision situation avoidance.

12. The integrated control method of claim 11, wherein the stabilization control of the ECS, the stabilization assist mode 1 control of the MDPS, the stabilization control of the ESC, and the limiting control of the AWD are performed by being divided into SLOW steering that is slow countersteer with respect to a steering wheel of a driver, and FAST steering that is fast countersteer with respect to the steering wheel of the driver.

13. The integrated control method of claim 12, wherein in a case of the SLOW steering, in the stabilization control of the ECS, a front wheel shock absorber of the vehicle is HARD to decrease a damping force and a rear wheel shock absorber is SOFT to increase damping force, in the stabilization assist mode 1 control of the MDPS, steering effort is lowered, in the stabilization control of the ESC, engine torque according to a unique torque vectoring control is decreased, and in the increasing torque distribution control of the AWD, torque distribution to front and rear wheels of the vehicle is performed as unique torque distribution.

14. The integrated control method of claim 12, wherein in a case of the FAST steering, in the stabilization control of the ECS, a front wheel shock absorber of the vehicle is HARD to decrease a damping force and a rear wheel shock absorber is SOFT to increase damping force, in the stabilization assist mode 1 control of the MDPS, steering effort is configured to be increased, in the stabilization control of the ESC, a unique torque vectoring control for a rotating external race of the vehicle is limited, and in the increasing torque distribution control of the AWD, unique torque distribution to front and rear wheels of the vehicle is configured to be increased.

15. A vehicle, comprising: an integrated controller configured to implement an integrated avoidance control in which when controlling an electronic chassis control system configured for an electronic control suspension (ECS), a motor driven power steering system (MDPS), and an all wheel drive (AWD) as auxiliary chassis systems in a forward collision situation, controls for the MDPS, and the AWD are performed to be according to an emergency avoidance control of the KS; and the electronic chassis control system configured to be controlled by the integrated controller, wherein in the integrated avoidance control, an avoidance condition determination mode in which Emergency Flg for a control of the electronic chassis control system is generated is performed; an avoidance grade application mode in which the Emergency Flg is graded as three grades of Emergency Flg 1, Emergency Flg 2, and Emergency Flg 3 to be applied to the control of the ECS, and the controls for each of the MDPS and the AWD according to the three-grade control of the ECS to perform the forward collision situation control is performed; and a vehicle stabilization mode in which after the forward collision situation control is performed by the three-grade control of the ECS, the controls for the MDPS, and the AWD are performed as independent control from the ECS to complete the forward collision situation avoidance is performed.

16. The vehicle of claim 15, wherein the integrated controller includes an emergency map, the emergency map including an emergency grade table according to which a control of the electronic chassis control system is changed in the forward collision situation of the vehicle, and a steering assist mode increasing steering force according to the emergency grade table.

17. The vehicle of claim 16, wherein the emergency grade table is divided into three grades of Emergency Flg 1, Emergency Flg 2, and Emergency Flg 3 and the steering assist modes is divided into two levels of a steering assist mode 1 and a steering assist mode 2.

18. The vehicle of claim 17, wherein the Emergency Flg 1 is matched to the steering assist mode 1, and the Emergency Flg 2 and the Emergency Flg 3 are matched to the steering assist mode 2.

19. The vehicle of claim 15, wherein the electronic chassis control system is configured for the auxiliary chassis systems including the ECS, the MDPS, the ESC, and the AWD.

20. The vehicle of claim 15, wherein the control of the ECS is applied to an electronic stability control (ESC), and the control for the ESC according to the three-grade control of the ECS to perform the forward collision situation control is performed; and a vehicle stabilization mode in which after the forward collision situation control is performed by the three-grade control of the ECS, the control for the ESC is performed as independent control from the ECS to complete the forward collision situation avoidance is performed.

* * * * *